United States Patent [19]

Youngblood

[11] 4,186,938
[45] Feb. 5, 1980

[54] VEHICLE TOW BAR

[76] Inventor: John W. Youngblood, 3201 Franklin Ave., Waco, Tex. 76710

[21] Appl. No.: 894,783

[22] Filed: Apr. 10, 1978

[51] Int. Cl.² .......................... B60P 3/06; B62D 53/04
[52] U.S. Cl. ...................................... 280/402; 414/563
[58] Field of Search ................... 280/402, 482, 490 R, 280/491 A, 496, 503, 479 R, 479 A; 214/86 A; 212/65; 414/563

[56] References Cited

U.S. PATENT DOCUMENTS

| | | | |
|---|---|---|---|
| 2,563,372 | 8/1951 | Risse | 280/490 R |
| 3,711,120 | 1/1973 | Winder | 280/402 X |
| 3,758,135 | 9/1973 | Kniff | 280/402 |
| 3,804,263 | 4/1974 | Castonguay | 212/65 |
| 3,831,980 | 8/1974 | Kniff | 280/402 |
| 3,836,024 | 9/1974 | Mantino | 212/65 |
| 3,885,815 | 5/1975 | Kniff | 280/402 |
| 3,984,120 | 10/1976 | Boveia | 280/402 |

Primary Examiner—John A. Pekar
Attorney, Agent, or Firm—Gerald G. Crutsinger; John F. Booth; Harry C. Post, III

[57] ABSTRACT

A tow bar which is connectable to a front wheel drive vehicle for maintaining the front wheels of the vehicle in an elevated position above a roadway while the vehicle is being towed behind another vehicle to minimize wear on the universal joints and transmission of the towed vehicle. The tow bar comprises a tongue portion having an upwardly inclined tongue extension connector secured to the front end thereof and a suspension support beam secured to the opposite end thereof. The tongue extension connector is adapted to receive a tongue extension piece having a trailer coupling secured to the outer end thereof which is connectable to a conventional coupling hitch ball on a trailer hitch. The suspension support beam has suspension support pins moveably secured to opposite ends thereof adapted to be actuated to engage the front wheel suspension mechanism of a vehicle for maintaining the front wheels of the vehicle elevated above the roadway while the vehicle is being towed.

15 Claims, 5 Drawing Figures

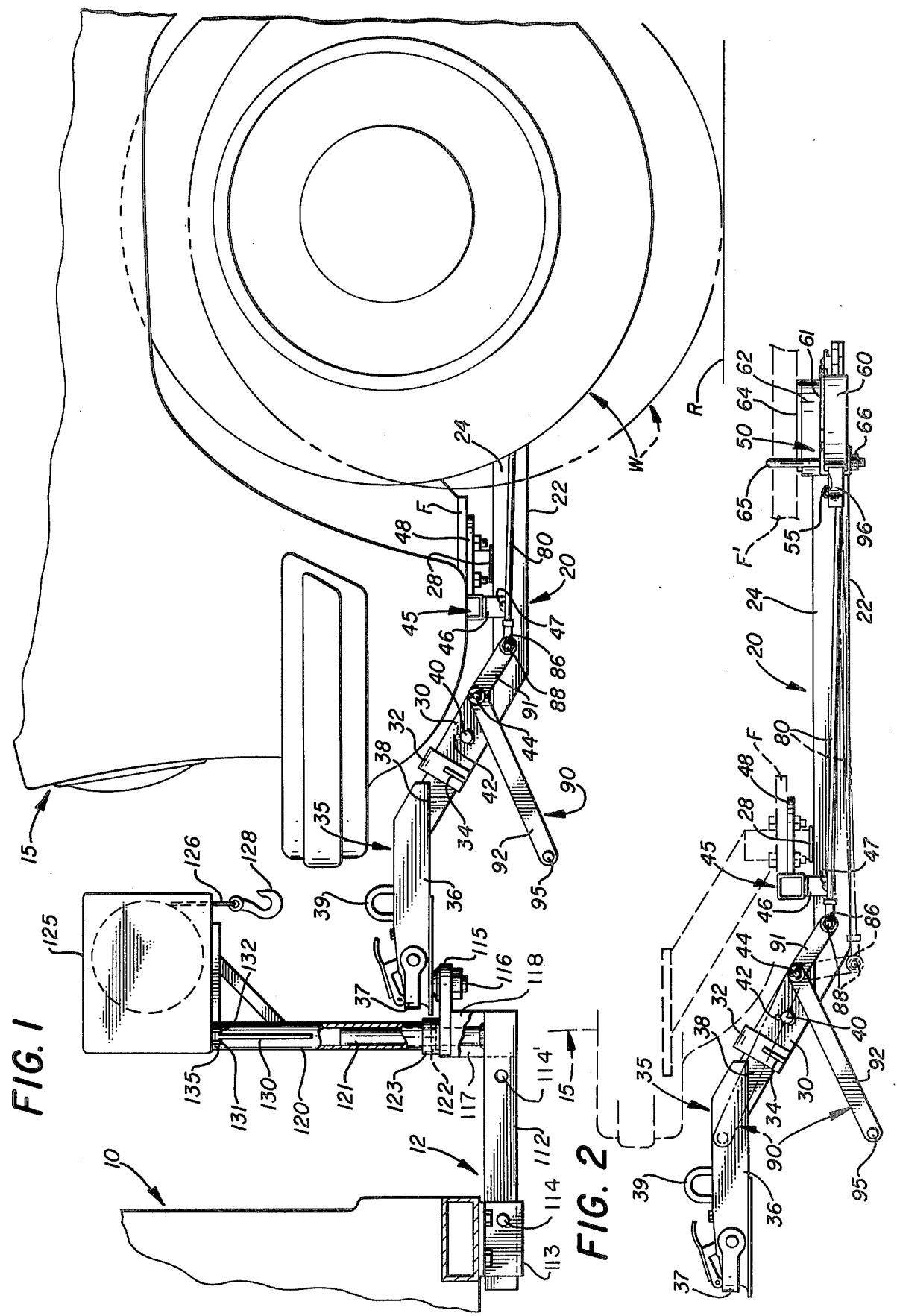

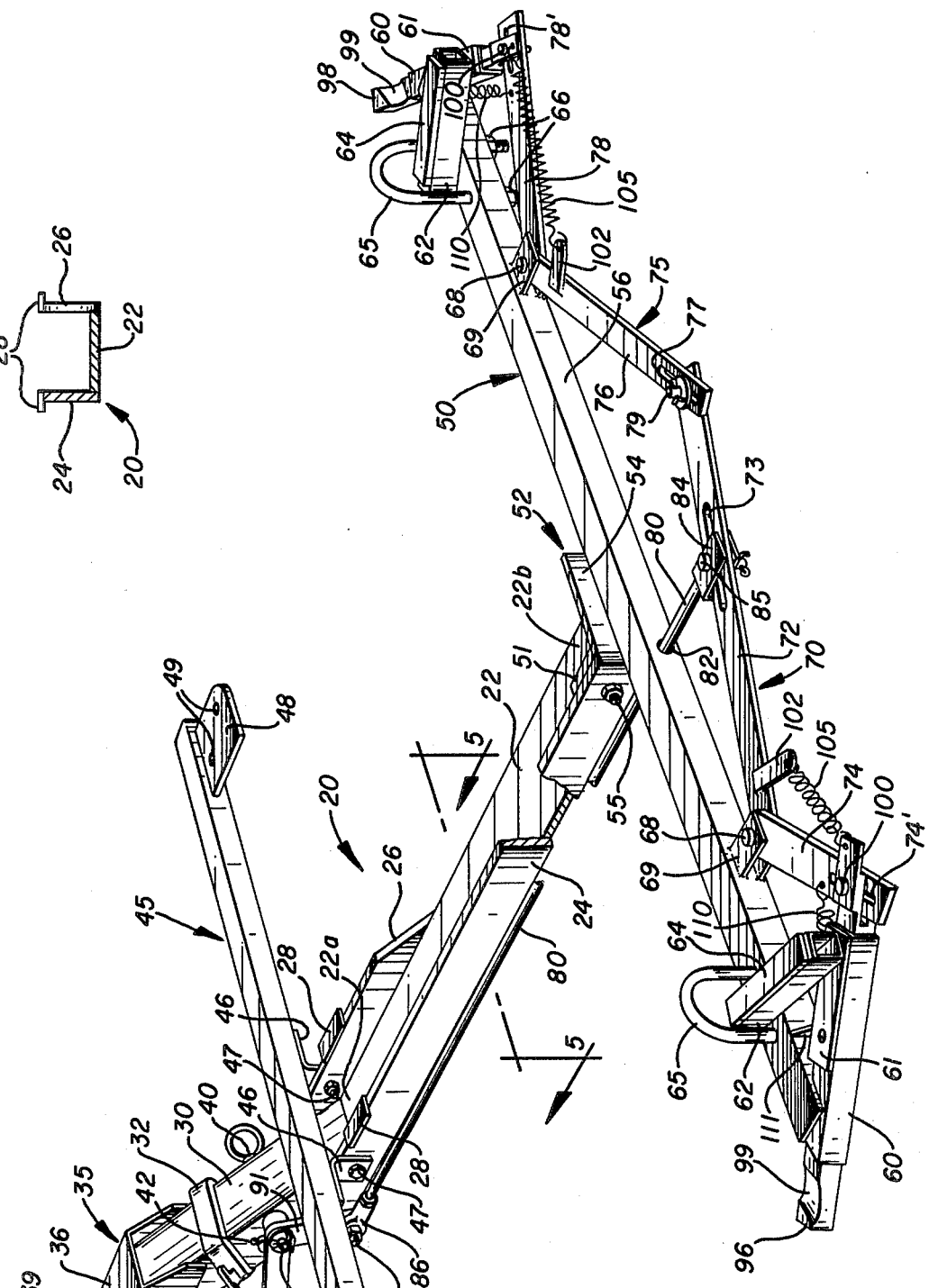

VEHICLE TOW BAR

BACKGROUND OF INVENTION

Various types of tow bars have been devised heretofore which are connectable to the front end of an automobile to permit towing the automobile behind another vehicle.

One such device has comprised a bumper support connectable to the front bumper of the towed vehicle, the bumper support having a tongue extending forwardly from the towed vehicle and connectable to the trailer hitch of a towing vehicle. Such devices must be removed to permit use of the towed vehicle or the tongue must be pivoted upwardly and somehow secured to prevent engagement with the ground.

Other vehicle towing devices are disclosed in U.S. Pat. No. 2,183,478; U.S. Pat. No. 3,784,036; U.S. Pat. No. 3,885,815 and U.S. Pat. No. 4,000,823.

When a vehicle is being towed, if the drive wheels of the towed vehicle are in rolling engagement with the roadway, the universal joints and transmission of the vehicle may experience unnecessary wear. Further, since the odometer of the vehicle generally registers rotation of the drive wheels, the odometer indicates that the vehicle has been driven a distance which is equal to the sum of the distance actually driven plus the distance which the vehicle has been towed. This results in substantial reduction of the resale value of the vehicle.

Heretofore, it has been necessary to raise the frame of the towed vehicle a substantial distance above the roadway to assure clearance of the wheels of the vehicle because springs urge the front wheels downwardly when the frame of the vehicle is elevated.

SUMMARY OF INVENTION

The invention disclosed herein is a vehicle tow bar comprising a tongue connectable to the frame or motor support and wheel support members of a vehicle which is to be towed. The front end of the tongue has an upwardly inclined tongue extension connector secured thereto for receiving a tongue extension piece having a coupling secured to the outer end thereof. The tongue extension piece is detachably secured to the tongue extension connector so that the coupling and tongue extension piece can be removed from the tongue when the vehicle is being driven. However, since the tongue extension connector is upwardly inclined the outer end of the tongue extension piece and the coupling are elevated above the roadway a sufficient distance so as to not engage the roadway when the vehicle is being driven.

A suspension support beam is secured to the rear end of the tongue and has a pair of bell cranks pivotally secured thereto for actuating suspension support pins moveably secured to opposite ends of the suspension support beam. An actuating rod is connected to the bell cranks and extends to a position excessible from the front end of the vehicle for actuating the suspension support pins between a first position spaced from the vehicle suspension mechanism and a second position engaging the vehicle wheel support suspension mechanism.

A primary object of the invention is to provide a vehicle tow bar connectable to a towed vehicle to permit normal use of the towed vehicle and to support the drive wheel suspension of the vehicle when the vehicle is being towed.

Another object of the invention is to provide a vehicle tow bar having a tongue and stabilizer beam connectable to the vehicle and having a tongue extension piece detachably secured to the tongue to permit removal of a coupling from the vehicle tow bar when the vehicle is being driven.

Another object of the invention is to provide a vehicle tow bar comprising a tongue connectable to a vehicle, the tongue having an upwardly inclined tongue extension connector on the end thereof for maintaining a trailer hitch coupling in an elevated position above the roadway when the vehicle is being driven.

A further object of the invention is to provide a vehicle tow bar which is connectable to a vehicle to be towed without modification of the vehicle.

A still further object of the invention is to provide a device engageable with the wheel suspension system of the vehicle for maintaining the wheels of the vehicle in an elevated position when the vehicle is being towed, the device being actuatable by a actuating lever accessible from the periphery of the vehicle.

A still further object is to provide an improved vehicle tow bar and trailer hitch, the trailer hitch pivotally supporting a winch having a cable connectable to the tow bar in a position to permit elevating the vehicle tow bar and subsequently moving the vehicle tow bar laterally for aligning a coupling on the tow bar vertically above a coupling hitch ball secured to the trailer hitch.

Other and further objects of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood, in which:

FIG. 1 is a fragmentary side elevational view of the front of a towed vehicle and the rear end of a towing vehicle, the improved vehicle tow bar and hitch extending therebetween;

FIG. 2 is a side elevational view of the vehicle tow bar;

FIG. 4 is a perspective view of the vehicle tow bar, the vehicle tow bar being detached from the towed vehicle; and FIG. 5 is a cross-sectional view taken along line 5—5 of FIG. 4.

Numeral references are employed to designate like parts throughout the various figures of the drawing.

DESCRIPTION OF A PREFERRED EMBODIMENT

Figure 3:
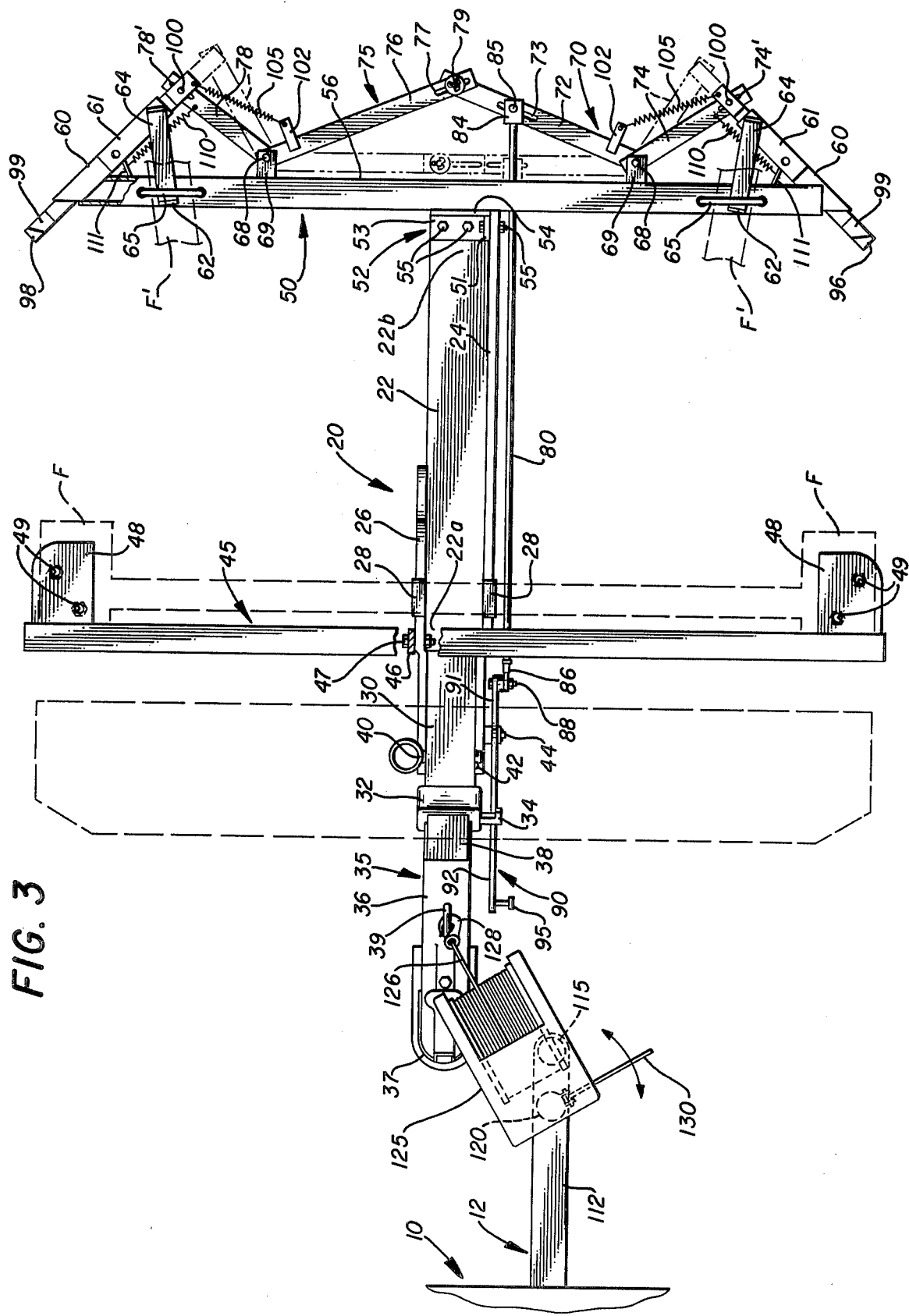
FIG. 3 is a top plan view of the vehicle tow bar, the vehicle tow bar being detached from the towed vehicle.

Referring to FIG. 1 of the drawing the numeral 10 generally designates a towing or draft vehicle having a hitch generally designated by the numeral 12 secured to the rear end thereof. A towed vehicle generally designated by the numeral 15 has a tow bar 20 secured thereto and connectable to the hitch 12 on the towing vehicle.

The towed vehicle 15 is of conventional design and is intended to illustrate a front wheel drive vehicle, for example of the type commercially available under the trademark "Honda".

The front wheels of a front wheel drive vehicle are supported on control arms, stabilizer bars, shock absorbers, springs or torsion bars, the wheel being driven by a drive axle which is powered by the engine of the vehicle through a transmission.

The under structure of front wheel drive vehicles is well known to persons skilled in the art and further description thereof is not deemed necessary.

Referring to FIGS. 4 and 5 of the drawing, tow bar 20 comprises a tongue 22 having an upwardly extending flat plate 24 welded or otherwise secured to one edge thereof and a second flat plate 26 welded or otherwise secured to an edge thereof adjacent the front end 22a of the tongue 22. Plates 24 and 26 have bearing pads 28 welded or otherwise secured to upper surfaces thereof.

A tongue extension connector 30, comprising a hollow tubular member, is secured to the outer end 22a of tongue 22. As best illustrated in FIG. 2 of the drawing the tongue extension connector 30 is deflected upwardly at an angle of approximately 30° relative to tongue 22. As will be hereinafter more fully explained, an actuating lever retainer collar 32 is secured to the outer end of a tongue extension connector 30 and has an actuating lever retainer lug 34 secured thereto.

A tongue extension piece generally designated by the numeral 35 comprises a horizontally disposed portion 36 and a downwardly extending inclined portion 38. The downwardly inclined portion 38 is adapted to be telescopically received in the hollow tubular extension connector 30 and is detachably secured thereto by an extension connector pin 40 extending through aligned apertures in opposite sides of tubular member 30 and in the inclined portion 38 of the tongue extension piece 35. Thus, pin 40 limits longitudinal movement of portion 38 of tongue extension piece 35 relative to tongue extension connector 30. A cotter key 42 or other suitable locking means is connected to the end of extension connector pin 40 to prevent accidental removal thereof, as for example as a result of vibration.

As will be hereinafter more fully explained, a stub axle 44 extends outwardly from tongue extension connector 30. However, stub axle 44 does not extend into the interior of tubular connector 30 so as to interfere with movement of portion 38 of tongue extension piece 35 relative to connector 30.

The horizontally disposed outer end 36 of tongue extension piece 35 has a trailer hitch coupling 37 secured to the outer end thereof, the coupling 37 having a socket therein to receive a hitch ball secured to a trailer hitch.

The internal structure of the trailer hitch coupler 37 is well known to persons skilled in the art.

A lifting eye 39 extends upwardly from the upper surface of the horizontally disposed portion of tongue extension piece 35 to facilitate attaching the coupler 37 to the hitch ball on a trailer hitch as will be hereinafter more fully explained.

Spaced plates 24 and 26 secured to edges of tongue 22 have apertures extending therethrough to receive bolts for securing tongue 22 to a hollow tubular rectangular stabilizer beam 45. Angle supports 46 are welded or otherwise secured in spaced apart relation to stabilizer beam 45 and have apertures extending therethrough. Bolts 48 extend through apertures in angle supports 46 and in plates 24 and 26 for securing stabilizer beam 45 to the tongue 22. Mounting plates 48 having apertures 49 formed therein are welded or otherwise secured to opposite ends of stabilizer beam 45 to facilitate attaching the stabilizer beam to a frame member F on the chassis of vehicle 15.

While stabilizer beam 45 is illustrated as a substantially straight tubular member in FIG. 4 of the drawing, it will be appreciated that it may be necessary to shape the stabilizer beam to pass around obstructions which extend downwardly from the chassis of vehicles constructed by various manufacturers.

A mounting bracket 52 is secured to the inner end 22b of tongue 22 and to a central portion of suspension support beam 50.

Mounting bracket 52 comprises an angle member having right angularly disposed flanges 53 and 54 and having a lug 51 welded thereto.

Flange 54 of mounting bracket 52 is welded or otherwise secured to a central portion of suspension support beam 50 and lug 51 and flange 53 are detachably secured to plate 24 and tongue 22, respectively, by bolts 55.

As best illustrated in FIGS. 3 and 4 of the drawing, suspension support beam 50 preferably comprises a hollow, tubular member having a rectangular or square cross-section.

A hollow, tubular sleeve 60 is welded or otherwise secured to each end of support beam 50. In the illustrated embodiment, a portion of the rear side wall 56 of tubular support beam 50 has been cut away such that a hollow tubular rectangular shaped sleeve 60 is positionable between upper and lower walls of the tubular support beam 50 and held in position as by welding.

As illustrated in FIG. 4, each of the hollow tubular sleeves 60 has a spacer 61 welded to an upper surface thereof, spacer 61 being welded to a lower surface of support strut 62. Each support strut 62 is welded or otherwise secured to suspension support beam 50 slightly inwardly from the end of the support beam so as to form a truss-like support structure for stabilizing the hollow tubular sleeves 60. Each of the support struts 62 preferably has a wear plate 64 secured to the upper surface thereof.

Shackles 65 are provided adjacent opposite ends of support beam 50 to facilitate attaching beam 50 to frame members F' of the chassis of the vehicle. In the particular embodiment of the invention illustrated in FIG. 4 of the drawing, shackles 65 comprise U-bolts which extend through spaced apertures adjacent opposite sides of support struts 62. It should be readily apparent that when U-bolts 65 are positioned over frame members F', nuts 66 can be threadedly secured to lower ends of the U-bolt for urging wear plates 64 into engagement with lower surfaces of frame members F' to thereby attach suspension support beam 50 to the chassis of the vehicle.

As best illustrated in FIGS. 3 and 4 of the drawing, a pair of bell cranks 70 and 75 are pivotally secured by pins 68 to lugs 69 secured to the rear wall 56 of suspension support beam 50.

Bell crank 70 comprises a first crank arm 72 having a slot 73 formed intermediate opposite ends thereof and a second crank arm 74 rigidly secured to the first crank arm 72 and angularly disposed relative thereto.

Bell crank 75 comprises a first crank arm 76 having a slot 77 formed therein adjacent the outer end thereof and a second crank arm 78 rigidly secured to the first crank arm 76.

The end of the first crank arm 72 of bell crank 70 has an aperture formed therethrough through which a bolt or pivot pin 79 extends. Pivot pin 79 also extends through slot 77 formed in arm 76 of bell crank 75 such that crank arms 72 and 76 are pivotally and slideably secured together.

An actuating rod 80 extends through an aperture 82 formed in suspension support beam 50 and has a clevis 84 secured to one end thereof. A pin 85 extends through aligned openings formed in clevis 84 and through slot 73 formed in the arm 72 of bell crank 70 for pivotally and slideably connecting actuating rod 80 to the bell crank 70.

A rod eye 86 is threadedly secured to the other end of actuating rod 80 and is pivotally secured by a bolt 88 to an actuating lever 90 pivotally secured to stub axle 44 mounted on tongue extension connector 30, as hereinbefore described.

Actuating lever 90 comprises a first link 91 which is pivotally secured by bolt 88 to rod eye 86 and a second link 92 having a handle 95 secured to the outer end thereof.

As will be hereinafter more fully explained, retainer lug 34 on collar 32 secured to tongue extension connector 30 is positioned to engage and lock link 92 in a raised position.

From the foregoing it should be readily apparent that movement of handle 95 imparts movement through actuating lever 90, actuating rod 80, bell cranks 70 and 75 to suspension support pins 96 and 98 slideably disposed in hollow tubular sleeves 60 secured to opposite ends of suspension support beam 50.

Each of the suspension support pins 96 and 98 has a groove or cradle 99 formed therein to engage and support a structural element such as a suspension strut (not shown) incorporated in the wheel suspension system of the vehicle.

The second crank arm 74 on bell crank 70 and the second crank arm 78 on bell crank 75 have slots 74' and 78', respectively, formed therein through which pivot pins 100 extend for hingedly connecting suspension support pins 96 and 98 to the bell cranks 70 and 75.

Each of the first crank arms 72 and 76 has an anchor ear 102 secured thereto and a spring 105 is secured to an outer end of each anchor ear 102 and to a lug 106 on suspension support pin 96 or 98.

Each of the second crank arms 74 and 78 has an aperture formed therein into which one end of a spring 110 extends. The opposite end of each spring 110 is secured to a member 111 secured to sleeve 60 adjacent the end of suspension support beam 50.

As best illustrated in FIG. 3 of the drawing, when handle 95 is moved upwardly from the position illustrated in FIG. 4 of the drawing, crank arms 74 and 78 move from the position shown in full outline in FIG. 3 to the position shown in dashed outline in FIG. 3. Thus, when handle 95 is moved upwardly springs 110 will be lengthened while springs 105 will become shorter. Springs 110 bias suspension support pins 96 and 98 to the extended position shown in full outline in FIG. 3 of the drawing.

In view of the foregoing, it should be readily apparent that the vehicle tow bar 20 can be mounted on a vehicle without substantial modification of the vehicle. It is not necessary that the tow bar 20 be removed from the vehicle to permit driving the vehicle in conventional manner. When link 92 is moved from the position illustrated in FIG. 4 of the drawing to a raised position and retained in the elevated position by retainer lug 34, suspension support pins 96 and 98 will be retracted into sleeves 60 so as to not interfere with operation of the suspension system of the vehicle.

When the vehicle is to be towed, while wheels W on the vehicle 15 are in engagement with the roadway, handle 95 will be disengaged from retainer lug 34 thereby causing springs 110 to exert force on bell cranks 70 and 75 for moving pins 96 and 98 to the extended position illustrated in FIG. 3 of the drawing. When pins 96 and 98 are in the extended position the front suspension system of the vehicle is engaged to prevent movement of wheels W when the coupler 37 on tongue extension piece 35 is attached to a hitch on another vehicle. Referring to FIG. 1 of the drawing, if suspension support pins 96 and 98 are not extended prior to elevating extension portion 35, the wheels W would remain in engagement with the surface of the roadway R as shown in dashed outline unless the front of the vehicle is raised several inches higher to exert force through the springs of the vehicle to lift the wheels W.

Referring to FIG. 1 of the drawing, the hitch 12 is of improved construction and is particularly adapted for use in connection with the tow bar 20 hereinbefore described. The combination of the specific hitch 12 and tow bar 20 is adapted to facilitate attaching the tow bar to the trailer hitch.

The hitch 12 generally comprises a draw bar 12 which is slideably disposed in a draw bar support sleeve 113 secured to the frame of the draft vehicle 10 by any suitable means, such as bolts. Draw bar 112, illustrated in an extended position in FIG. 1 of the drawing, has at least two apertures 114' extending therethrough. A draw bar anchor pin 114 is positionable through apertures 114' in draw bar support sleeve and in draw bar 112 for locking draw bar in the extended position as illustrated in FIG. 1 or in a retracted position by moving draw bar 112 inwardly through draw bar support sleeve 113.

A hitch mounting plate 115 is welded or otherwise secured to the upper ends of vertically extending spacer plates 117 and 118 which are welded or otherwise secured to the outer end of draw bar 112. Spacer plate 115 has a hole formed therein to receive the shank on the end of a conventional hitch coupling ball 116.

Hitch mounting plate 115 has a further aperture formed therethrough between the upper ends of spacer plates 117 and 118 through which a pivot post 121 extends. The lower end of pivot post 121 is welded or otherwise secured to the upper surface of draw bar 112. The upper end of pivot post 121 extends into a hollow tubular stanchion 120, the lower end of stanchion 120 resting upon a thrust bearing 122 positioned between the lower end of stanchion 120 and the upper surface of hitch mounting plate 115. A dust cover 123 is positioned to enclose thrust bearing 122.

A winch 125 is secured to the upper end of stanchion 120. Winch 125 preferably is driven by, for example a 12 volt electric vehicle battery, and is controlled by a three-way power switch having a raise, stop, and lower position. However, it should be appreciated that winch 125 may be manually or hydraulically driven. Winch 125 has a cable 126 and a lifting hook 128 positionable in lifting eye 39 on the horizontally disposed portion 36 of tongue extension piece 35.

A handle 130 is pivotally secured between lugs 131 and 132 by a pin 135. Lugs 131 and 132 are welded or otherwise secured to the upper end of stanchion 120 or to the housing of winch 125.

Referring to FIGS. 1 and 3 of the drawing, it should be noted that when cable 126 extends vertically downwardly from winch 125 to engage lifting eye 39, the hitch ball 116 and coupling 37 are positioned between the lifting eye 39 and stanchion 120.

As illustrated in FIG. 3 of the drawing, when coupler 37 is positioned adjacent coupling ball 116, handle 130 can be pivoted upwardly to facilitate rotating stanchion 120. When lifting hook 128 is positioned in lifting eye 39 and winch 125 is employed for elevating the tow bar 20, hitch coupler 37 will be laterally spaced from coupler ball 116. Handle bar 130 may then by employed for rotating stanchion 120 and coupler 37 to a position vertically above coupler ball 116. When winch 125 is reversed, coupler 37 will move downwardly to receive coupler ball 116.

As hereinbefore noted, if vehicle 15 is not being towed, the vehicle may be driven without removing tow bar 20 from the vehicle. If it is deemed expedient to do so, the tongue extension piece 35 may be disconnected from tongue extension connector 30 by removing extension connector pin 40 such that the downwardly inclined portion 38 of tongue extension piece 35 can be removed from the hollow upwardly inclined portion of tongue extension connector 30.

Having described my invention, I claim:

1. A vehicle tow bar adapted to be secured to the chassis of a towed vehicle and to extend outwardly from the front end of the towed vehicle for connecting the towed vehicle to a hitch on a towing vehicle, the tow bar comprising: a tongue; a suspension support beam; means securing said suspension support beam to said tongue; a pair of suspension support pins; means moveably securing one of said suspension support pins to each end of said suspension support beams, said means moveably securing one of said suspension support pins to each end of said suspension support beams comprises a hollow tubular sleeve and means securing said hollow tubular sleeve to said suspension support beam, each of said suspension support ends being slideably disposed in said hollow tubular sleeve; actuating means secured to said suspension support beam and associated with said suspension support pins for moving said suspension support pins between a first position spaced from the wheel suspension mechanism of the towed vehcile and a second position engaging the wheel suspension support mechanism of the towed vehicle; a tongue extension connector on the tongue, said tongue extension connector being upwardly inclined relative to said tongue; a tongue extension; means adjustably and detachably securing said tongue extension to said tongue extension connector; and a hitch coupler secured to said tongue extension, said coupler being adapted to engage the hitch on the towing vehicle.

2. A tow bar according to claim 1, said actuating means secured to said suspension support beam and associated with said suspension support pins comprising: a pair of bell cranks; means pivotally securing each of said bell cranks to said suspension support beam; means pivotally securing one of said bell cranks to each of said suspension support pins; an actuating rod; means securing one end of said actuating rod to each of said bell cranks.

3. A vehicle tow bar adapted to be secured to a towed vehicle for connecting the towed vehicle to a hitch on a towing vehicle, comprising: a tongue; a tongue extension connector mounted with and upwardly inclined relative to said tongue; a tongue extension adjustably and detachably secured to said tongue extension connector; a hitch coupler adapted to engage the hitch on the towing vehicle secured to said tongue extension; a suspension support beam secured to said tongue and to said towed vehicle; a pair of suspension support pins for engaging the suspension support mechanism of the front wheels of the towed vehicle; means moveably securing one of said suspension support pins to each end of said suspension support beam; and actuating means secured to said suspension beam for moving said suspension pins between a first position spaced from the wheel suspension mechanism of the towed vehcile to permit use of such vehicle when disconnected from the towing vehicle and a second position engaging the wheel suspension support mechanism to prevent movement of the front wheels of the towed vehicle relative to said suspension support beam upon connection of the tongue to the hitch of the towing vehicle.

4. A vehicle tow bar as set forth in claim 3, including: a hollow tubular sleeve and means securing said hollow tubular sleeve to said suspension support beam with each of said suspension support pins being slideably disposed in said hollow tubular sleeve.

5. A vehicle tow bar as set forth in claim 4, wherein said actuating means includes a pair of bell cranks pivotally secured to said suspension support beam, means pivotally securing one of said bell cranks to each of said suspension support pins, and an actuating rod with one end thereof being secured to each of said bell cranks.

6. The combination of a trailer hitch on a draft vehicle and a tow bar on a drawn vehicle particularly adapted to facilitate connecting the tow bar to the trailer hitch comprising: a draw bar; means slideably securing said draw bar to a draft vehicle; anchor means adapted to lock said draw bar in a retracted position and in and extended position relative to the draft vehicle; a stanchion; means pivotally securing said stanchion to said draw bar; a winch; means securing said winch to said stanchion above the draw bar; a hitch ball; means securing said hitch ball to said draw bar; a flexible cable secured to said winch and connectable to a lifting eye on a tongue of a vehicle to be towed, said winch being adapted to lift the tongue; means secured to the stanchion to rotate the stanchion; a tongue; means securing the tongue to the chassis of the vehicle to be towed; a hitch coupler secured to said tongue; and a lifting eye secured to said tongue, said lifting eye being positioned on said tongue and said winch being positioned on said stanchion such that when said cable is secured to the lifting eye and the tongue is suspended from said cable, the hitch coupler is vertically positioned above the hitch ball by rotating said stanchion.

7. A combination according to claim 6, said means securing said winch to said stanchion above the draw bar comprising: means for positioning said winch such that when said cable is extended vertically downwardly from said winch, the hitch ball is between said cable and said stanchion.

8. A combination according to claim 6, said means to rotate said stanchion comprising: a handle bar; and means securing said handle bar to said stanchion.

9. A combination according to claim 6, said means pivotally securing said stanchion to said draw bar comprising: a pivot post secured to said draw bar, and said stanchion comprising: a hollow tubular member, said pivot post extending into the lower end of said hollow tubular member.

10. A combination according to claim 6, with said means to secure said draw bar to a draft vehicle comprising: a sleeve, said draw bar being slideably disposed in said sleeve; and anchor means adapted to lock said draw bar in a retracted position when said stanchion is adjacent the draft vehicle and in an extended position when said stanchion is spaced from the draft vehicle.

11. A combination according to claim 6, wherein said means securing the tongue to the chassis of the vehicle to be towed includes: a tongue extension connector mounted with and upwardly inclined relative to said tongue; a tongue extension adjustably and detachably secured to said tongue extension connector; and said hitch coupler being secured to said tongue extension.

12. A combination according to claim 11, wherein said means securing the tongue to the chassis of the vehicle to be towed includes; a suspension support beam secured to said tongue and to said towed vehicle; a pair of suspension support pins for engaging the suspension support mechanism of the front wheels of the towed vehicle; means moveably securing one of said suspension support pins to each end of said suspension support beam; and actuating means secured to said suspension support beam for moving said suspension support pins between a first position spaced from the wheel suspension mechanism of the towed vehicle to permit use of such vehicle when disconnected from the towing vehicle and a second position engaging the wheel suspension support mechanism to prevent movement of the front wheels of the towed vehicle relative to said suspension support beam upon connection of the tongue to the hitch of the towing vehicle.

13. A combination according to claim 12, wherein said means securing the tongue to the chassis of the vehicle to be towed further includes: a hollow tubular sleeve and means securing said hollow tubular sleeve to said suspension support beam with each of said suspension pins being slideably disposed in said hollow tubular sleeve.

14. A combination according to claim 13, wherein said means securing the tongue to the chassis of the vehicle to be towed further includes: a pair of bell cranks pivotally secured to said suspension support beam, means pivotally securing one of said bell cranks to each of said suspension support pins, an actuating rod, and means securing one end of said actuating rod to each of said bell cranks.

15. A combination according to claim 6, wherein said means securing said winch to said stanchion above the draw bar includes means for positioning said winch such that when said cable is extended vertically downwardly from said winch the hitch ball is between said cable and said stanchion; wherein said means to rotate said stanchion includes a handle bar and means securing said handle bar to said stanchion; wherein said means pivotally securing said stanchion to said draw bar includes a pivot post secured to said draw bar and said stanchion includes a hollow tubular member with said pivot post extending into the lower end of said hollow tubular member; and wherein said means to secure said draw bar to the draft vehicle includes a sleeve with said draw bar being slidably disposed in said sleeve and anchor means adapted to lock said draw bar in a retracted position when said stanchion is adjacent the draft vehicle and in an extended position when said stanchion is spaced from the draft vehicle; and wherein said means securing the tongue to the chassis of the vehicle to be towed includes: a tongue extension connector mounted with and upwardly inclined relative to said tongue, a tongue extension adjustably and detachably secured to said tongue extension connector, said hitch coupler being secured to said tongue extension, a suspension support beam secured to said tongue and to said towed vehicle, a pair of suspension support pins for engaging the suspension support mechanism of the front wheels of the towed vehicle, a pair of hollow tubular sleeves, means securing one of said hollow tubular sleeves to each end of said suspension support beam with a suspension support pin being slideably disposed in each hollow tubular sleeve, a pair of bell cranks pivotally secured to said suspension support beam, means pivotally securing one of said bell cranks to each of said suspension support pins, an actuating rod, and means securing one end of said actuating rod to each of said bell cranks to thereby move said suspension support pins between a first position spaced from the wheel suspension mechanism of the towed vehicle to permit use of such vehicle when disconnected from the towing vehicle and a second position engaging the wheel suspension support mechanism to prevent movement of the front wheels of the towed vehicle relative to said suspension support beam upon connection of the tongue to the hitch of the towing vehicle.

* * * * *